(12) United States Patent
Lin et al.

(10) Patent No.: US 10,719,114 B2
(45) Date of Patent: Jul. 21, 2020

(54) DATA SOURCE AND DISPLAY HAVING POWER CIRCUITS PROVIDING DIFFERENT OUTPUT VOLTAGES BASED ON DUTY CYCLE

(71) Applicants: STMicroelectronics (Shenzhen) R&D Co. Ltd., Shenzhen (CN); STMICROELECTRONICS LTD., Kowloon (HK)

(72) Inventors: Andy Lin, Taipei (TW); Johnny Yoon, Taipei (TW); Danny Sheng, Shenzhen (CN)

(73) Assignees: STMicroelectronics (Shenzhen) R&D Co. Ltd., Shenzhen (CN); STMicroelectronics Ltd., Kowloon (HK)

(*) Notice: Subject to any disclaimer, the term of this patent is extended or adjusted under 35 U.S.C. 154(b) by 80 days.

(21) Appl. No.: 15/966,808

(22) Filed: Apr. 30, 2018

(65) Prior Publication Data

US 2018/0246553 A1    Aug. 30, 2018

Related U.S. Application Data

(63) Continuation of application No. 13/458,029, filed on Apr. 27, 2012, now Pat. No. 9,958,919.

(30) Foreign Application Priority Data

Apr. 27, 2011    (CN) .......................... 2011 1 0115508

(51) Int. Cl.
*G06F 1/26* (2006.01)
*G09G 3/20* (2006.01)

(52) U.S. Cl.
CPC ........... *G06F 1/266* (2013.01); *G09G 3/2092* (2013.01); *G09G 2330/028* (2013.01); *G09G 2330/04* (2013.01)

(58) Field of Classification Search
CPC .. G06F 1/266; G09G 3/2092; G09G 2330/04; G09G 2330/028
See application file for complete search history.

(56) References Cited

U.S. PATENT DOCUMENTS

| | | | |
|---|---|---|---|
| 2005/0033996 A1* | 2/2005 | Fong | ...................... G06F 1/266 713/300 |
| 2005/0268134 A1 | 12/2005 | Park | |
| 2006/0082570 A1 | 4/2006 | Noorbakhsh et al. | |

(Continued)

FOREIGN PATENT DOCUMENTS

| | | |
|---|---|---|
| CN | 1282908 A | 2/2001 |
| CN | 2643308 Y | 9/2004 |

(Continued)

*Primary Examiner* — Yaron Cohen
(74) *Attorney, Agent, or Firm* — Slater Matsil, LLP

(57) ABSTRACT

An embodiment is a circuit for use with a display device, the circuit including: a first input node configured to be operatively coupled to a first port of a data source device that provides the display device with data, to receive a first direct voltage used for a real-time display of the data on the display device; and at least one output node, configured to operatively provide the display device with at least one output voltage generated based on the first direct voltage, wherein the first port is isolated from a data port used to transmit the data.

20 Claims, 10 Drawing Sheets

(56) References Cited

U.S. PATENT DOCUMENTS

| | | | |
|---|---|---|---|
| 2006/0218415 A1* | 9/2006 | Mak-Fan | G06F 1/266 |
| | | | 713/300 |
| 2006/0242435 A1* | 10/2006 | Swope | G06F 1/26 |
| | | | 713/300 |
| 2009/0035710 A1 | 2/2009 | Peruch | |
| 2009/0147028 A1 | 6/2009 | Sefton et al. | |
| 2011/0148740 A1 | 6/2011 | Perkins et al. | |

FOREIGN PATENT DOCUMENTS

| CN | 2643380 Y | 9/2004 |
|---|---|---|
| CN | 201041734 Y | 3/2008 |

* cited by examiner

DATA SOURCE AND DISPLAY HAVING POWER CIRCUITS PROVIDING DIFFERENT OUTPUT VOLTAGES BASED ON DUTY CYCLE

CROSS-REFERENCE TO RELATED APPLICATIONS

This application is a continuation of U.S. patent application Ser. No. 13/458,029, filed Apr. 27, 2012, which application claims the benefit of Chinese Patent Application No. 201110115508.2, filed on Apr. 27, 2011, which application is hereby incorporated herein by reference.

TECHNICAL FIELD

An embodiment relates generally to electronic circuits, and more particularly to a circuit for use with display devices and a method for supplying power.

BACKGROUND

To support various signal formats, current computers and audio/video apparati, for example DVD players, provide various data ports, for example USB (Universal Serial BUS) Port, VGA (Video Graphics Array) Port, HDMI (High-Definition Multimedia Interface) Port, DP (Display Port) Port, etc. The ports not only enable data transmission, but also supply power to some low power consumption devices, such as mobile phones, digital cameras, mouses, etc.

FIG. 1 shows an example in which a computer 10 supplies power to and transmits data to a mouse 11 via a USB port 12. As shown, the mouse 11 includes a voltage converter 13 and a microprocessor unit (MCU) 14. The USB cable encases four wires: a power supply wire 15, a ground wire 16, a positive data wire 17, and a negative data wire 18 (e.g., for differential data transmission). Wires 15 and 16 are coupled to the voltage converter 13 of the mouse 11 to obtain operating voltages for modules of the mouse ii, and the data wires 17 and 18 are coupled to the MCU 14 of the mouse 11 to enable data transmission between the mouse 11 and the computer 10.

In the configuration of FIG. 1, the port 12 not only enables the data transmission between the computer 10 and the mouse 11, but also enables power to be supplied from the computer 10 to the mouse 11. However, the power supplied via USB Port, DP Port, or HDMI Port is very limited because such power is mainly aimed at supporting data transmission. For example, a USB power wire typically provides a voltage of 5V, and the upper limit of current is generally about 950 mA. For another example, a DP Port typically provides a power of about 1.5W. After it is coupled with a computer or an audio/video apparatus, the display device may fail to normally display the audio/video, operate unstably, or fail to operate in an optimum state if it operates by only using the power supplied via ports like a USB Port. Therefore, display devices usually also need to be coupled to another power source such as commercial power. However, this may lead to inconvenience during use. For example, positioning of the display device is restricted not only by data wires between the display device and the audio/video apparatus, but also by its own power supply wire. In addition, there may be limited power sockets such that the audio/video apparatus and the display device cannot be used simultaneously.

SUMMARY

Thus, there is a need for improved circuit and method for supplying power to a display device.

In an embodiment, there is provided a circuit for use with a display device. The circuit includes a first input node, configured to be operatively coupled to a first port of a data source device that provides the display device with data, to receive a first direct voltage used for a real-time display of the data on the display device; and at least one output node, configured to operatively provide the display device with at least one output voltage generated based on the first direct voltage. The first port is isolated from a data port used to transmit the data.

In another embodiment, there is provided a DC-DC converter. The DC-DC converter includes a circuit according to an embodiment of the disclosure.

In still another embodiment, there is provided a circuit for use with a data source device, wherein the data source device is configured to provide a display device with data. The circuit includes a first output node, coupled to the display device via a first port, to provide the display device with a first direct voltage used for a real-time display of the data on the display device. The first port is isolated from a data port used to transmit the data.

In still another embodiment, there is provided a method. The method includes coupling a display device to a data source device that provides the display device with data via a power supply wire isolated from a data wire, to enable the display device to receive a first direct voltage from the data source device. The first direct voltage is used for a real-time display of the data on the display device.

The foregoing has outlined, rather broadly, features of the present disclosure. Additional features of the disclosure will be described hereinafter. It should be appreciated by those skilled in the art that the conceptions and specific embodiments disclosed may be readily utilized as a basis for modifying or designing other structures or processes for carrying out the same purposes. It should also be realized by those skilled in the art that such equivalent constructions do not depart from the spirit and scope of the disclosure.

BRIEF DESCRIPTION OF THE DRAWINGS

For a more complete understanding of the present disclosure and advantages described herein, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The implementation and usage of embodiments are discussed below in detail. It should be appreciated that the specific embodiments discussed are merely illustrative of specific ways to implement and use concepts discussed in this disclosure invention, and do not limit the scope of this disclosure.

Figure 2:
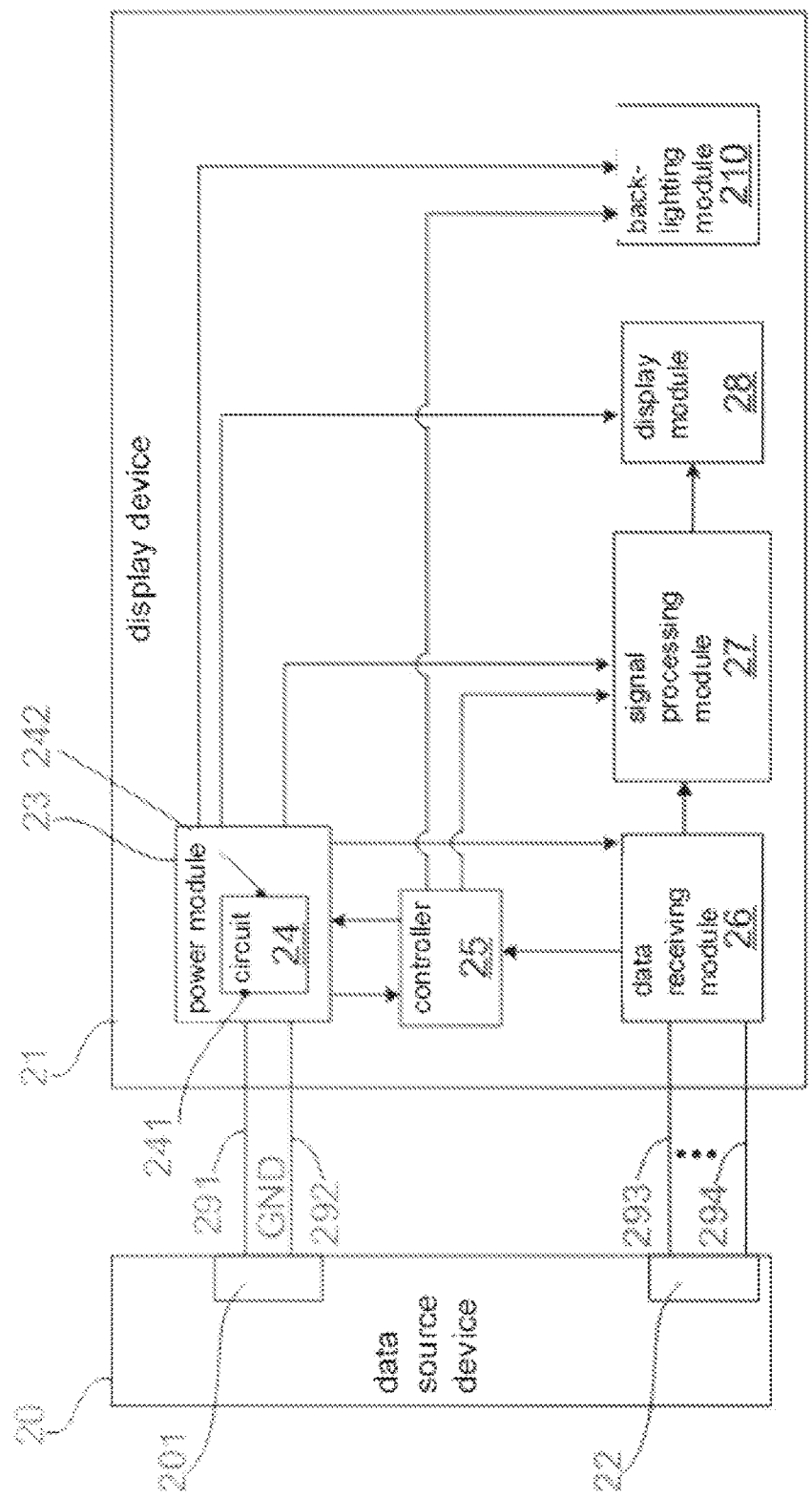
FIG. 2 shows a schematic drawing of a circuit for use with a display device according to an exemplary embodiment of the disclosure.

FIG. 2 shows a schematic drawing of a circuit 24 for use with a display device according to an exemplary embodiment of the disclosure. In FIG. 2, by way of example, the circuit 24 is used with a display device 21. As shown, the circuit 24 is included in a power supply module 23 of the display device 21. The display device 21 mainly includes a power supply module 23, a controller 25, a data receiving module 26, a signal processing module 27, a display module 28 and a backlighting module 210. The display device 21 may be, for example, a liquid-crystal display (LCD), a plasma display, etc.

In operation, a first input node 241 of the circuit 24 is coupled to a first port 201 of a data source device 20 (for example, a computer, a DVD player, etc.) via a power supply wire 291 to receive a first direct voltage, and the other power supply wire 292 is grounded to provide a reference voltage. The circuit 24 further includes at least one output node 242 to output at least one output voltage based on the first direct voltage. The configuration of the circuit 24 will be exemplarily illustrated hereinafter. The power supply module 23 including the circuit 24 supplies power to the controller 25 and, under the control of the controller 25, supplies power to the data receiving module 26, the signal processing module 27, the display module 28, and the backlighting module 210. The data receiving module 26 receives data to be displayed from a data port 22 of the data source device 20. Depending on the data format, the data port 22 may be a HDMI Port, or a DP Port, etc. The data can be transmitted to the data receiving module 26 via multiple data wires 293 . . . 294. The data receiving module 26 typically includes a decoder to decode the received data and to obtain a video signal, audio signal, and synchronizing signal. The signal processing module 27 typically includes a scaler, receives a video signal from the data receiving module 26, and converts the video signal into a format suitable for displaying on the display device 21.

Specifically, the first input node 241 may be coupled to, for example, a peripheral connector of the data source device 20 to obtain a direct voltage of 12V or 5V, which is used for a real-time display of the data from the data source device 20 on the display device 21.

One or more of the following advantages may be realized by employing an embodiment of the circuit 24 of FIG. 2.

Figure 1:
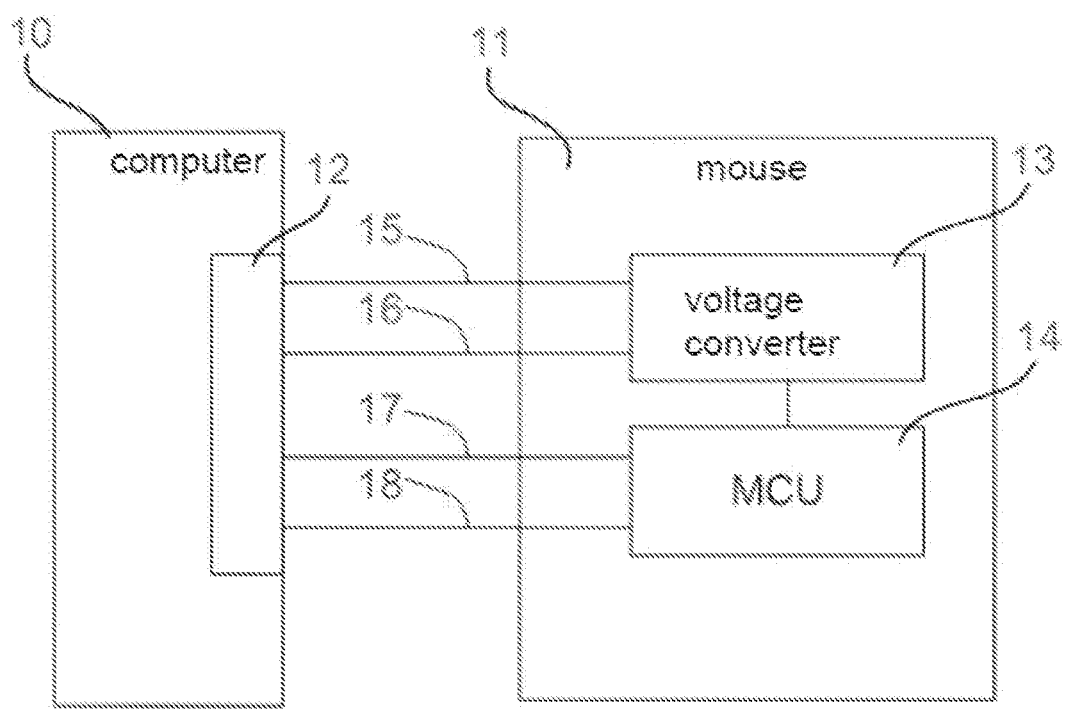
FIG. 1 shows an example where a computer supplies data and power to a mouse via a USB port.

First, because the first port 201 is isolated from the data port 22, the first port 201 doesn't need to conform to Data Port Specifications of the data port 22, which provides flexibility in design of the first port 201. Depending on the power consumption of the display device 21, the first port 201 may be coupled to one of the multiple output voltages provided by the power supply module of the data source device 20. In this way, the first input node 241 of the circuit 24 coupled to the first port 201 can obtain enough power. Thus, situations where the display device fails to normally display the audio/video, operates unstably, or fails to operate in an optimum state, which may be caused by supplying power via power wires of a data port (as shown in FIG. 1), can be avoided.

In addition, because it employs the circuit 24, the display device 21 doesn't need to be coupled to a commercial power socket, which means that an AC-DC converter is not necessary and provides flexibility in design of the display device. For example, because the power supply module 23 doesn't include an AC-DC converter, the power supply module 23, the controller 25, and the data receiving module 26 can be located on one circuit board. Therefore, the space that is otherwise occupied by cables coupled between circuit boards and the labor for connecting such cables are saved. Furthermore, the modules, such as the power supply module 23, the controller 25, and the data receiving module 26, can be integrated in one chip, and signal delay caused by wiring between chips is reduced or eliminated.

Additionally, because an AC-DC converter is not necessary, energy loss due to AC-DC converting can be avoided, which promotes low carbon emissions.

Furthermore, the display device 21 can be thinner without an AC-DC converter. Because the display device 21 doesn't need to be coupled to commercial power, it isn't restricted by commercial power wires during positioning.

It should be appreciated that the first port 201 being isolated from the data port 22 means that the first port 201 is electrically isolated from the data port 22. In operation, the ports 201 and 22 can be placed in different interface connectors of the data source device 20. Alternatively, the ports 201 and 22 can be placed in the same interface connector of the data source device 20.

Figure 3:
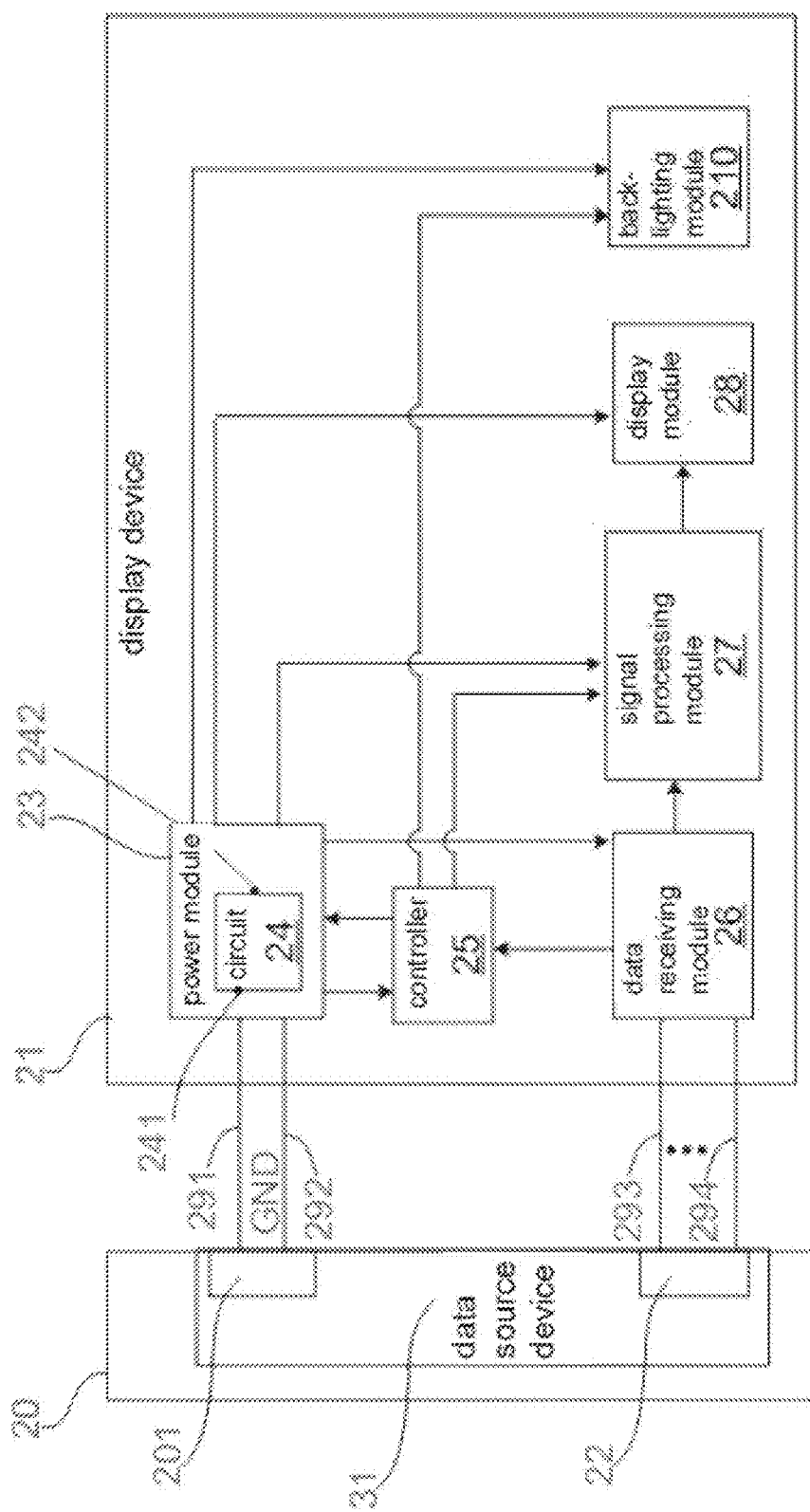
FIG. 3 shows another exemplary position of the first port of FIG. 2 on the data source device.

As shown in FIG. 3, the first port 201 and the data port 22 are placed in one connector 31 of the data source device 20, i.e., viewed from the outside of the data source device 20, power supply wires 291 and 292 and data wires 293 . . . 294 are led out from the same connector 31.

Figure 4:
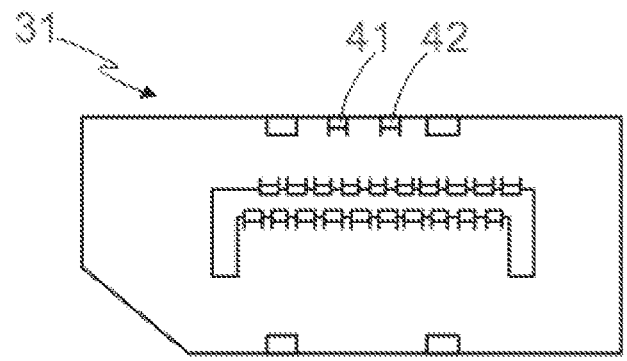
FIG. 4 shows an exemplary configuration of the port 31 of FIG. 3.

FIG. 4 shows an exemplary configuration of the connector 31 of FIG. 3 in which the data port 22 is a DP Port. The connector 31 includes 22 pin sockets, wherein the pin sockets 41 and 42 correspond to the first port 201, and the other 20 correspond to the data port 22. Specifically, one end of the power supply wire 291 is coupled to the pin socket 41 and the other end is coupled to the first input node 241 so that the first input node 241 can obtain the first direct voltage from the data source device 20.

It should be appreciated that although FIG. 4 shows that the first port 201 includes a pair of pin sockets 41 and 42 for the purpose of supplying power, the first port 201 can include multiple pairs of such pin sockets, respectively coupled to multiple pairs of power and ground wires, to provide more power.

Additionally, the power wires 291 and 292 and the data wires 293 . . . 294 led out from the connector 31 can be encapsulated in one cable. The cable has a connector corresponding to the connector 31 on the end for connecting to the data source device 20 and a same (or similar) connector on the other end for connecting to the display device 21. Accordingly, the display device 21 has a connector that is the same as or similar to the connector 31 shown in FIG. 4 so as to be coupled with the connector of the cable encapsulating the power wires 291 and 292 and the data wires 293 . . . 294. Being so configured, when viewed from the outside, there exists only one cable between the data source device 20 and the display device 21. Alternatively, the cable may be a single one near the data source device 20 and split into two branches near the display device 21, one branch encapsulating the power wires and the other branch encapsulating the data wires, so that the cable has two connectors on the end adjacent the display device 21. Accordingly, the display device 21 is provided with two connectors for coupling to the cable.

Figure 5:
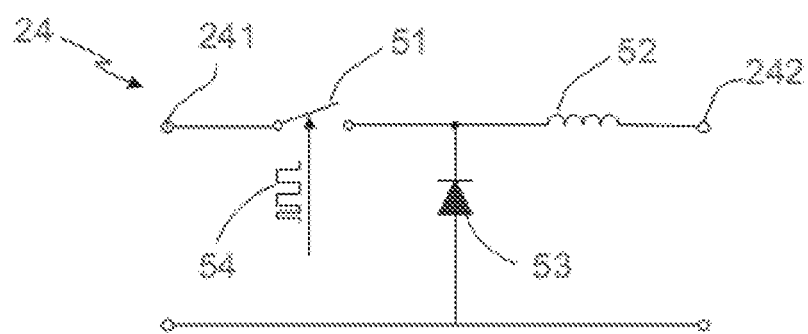
FIG. 5 shows an exemplary configuration of the circuit of FIG. 2.

It should be appreciated that the circuit 24 may be realized by a low dropout (LDO) linear voltage regulator, or a step-down DC-DC converter (Buck converter), etc. FIG. 5 shows an exemplary construction of DC-DC converter circuit 24.

As shown, the circuit 24 includes a switch 51, an inductor 52, and a diode 53. In operation, the first input node 241 of the circuit 24 is coupled to the first port 201 of the data source device 20 (as shown in FIG. 2) to receive a first direct voltage, for example, 12V or 5V. The switch is controlled by a PWM signal 54. When the switch 51 is closed, the inductor 52 is charged. When the switch 51 is opened, the inductor 52 is discharged through the diode 53 and a load (not shown) externally coupled between the output node 242 and the reference line. There may also be a bypass capacitor coupled between the node 242 and the reference line. By changing the duty ratio of the PWM signal 54, different regulated output voltages can be realized, for example, the first direct voltage can be converted to 3.3V, or 1.2V, etc.

It should be appreciated that, the construction in FIG. 5 is just exemplary, but not restrictive. The particular construction of the circuit 24 is not a limiting factor of the disclosure, and the circuit 24 can be implemented using any suitable circuit that implements voltage conversion.

Figure 6:
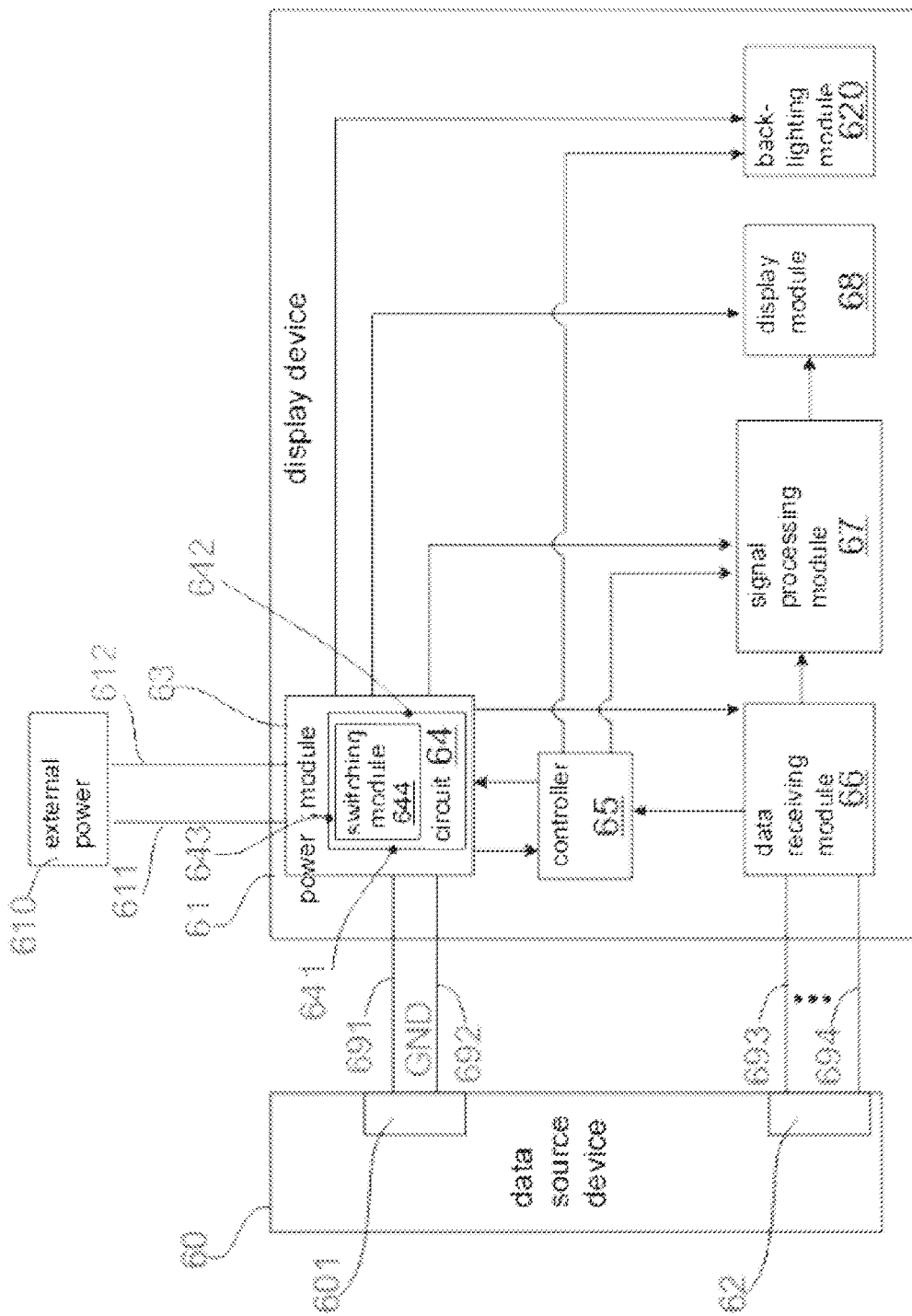
FIG. 6 shows a schematic drawing of a circuit for use with a display device according to another exemplary embodiment of the disclosure.

FIG. 6 shows a schematic drawing of a circuit 64 for use with a display device according to another exemplary embodiment of the disclosure. In FIG. 6, by way of example, the circuit 64 is used with a display device 61. As shown, the circuit 64 is included in a power supply module 63 of the display device 61. The display device 61 mainly includes the power supply module 63, a controller 65, a data receiving module 66, a signal processing module 67, a display module 68, and a backlighting module 620. The display device 61 may be, for example, a liquid crystal display, a plasma display, etc.

In operation, a first input node 641 of the circuit 64 is coupled to a first port 601 of a data source device 60 (for example, a computer, a DVD player, etc.) via a power supply wire 691 to receive a first direct voltage, and the other power supply wire 692 is grounded to provide a reference voltage. The circuit 64 further includes a second input node 643, coupled to an external power supply 610 via a power supply wire 611, to receive a second direct voltage. The circuit 64 further includes a switch module 644 coupled between the first input node 641, the second input node 643 and the output node 642, configured to operatively switch between the first input node 641 and the second input node 643. When the switch module 644 is switched to the first input node 641, the circuit 64 receives the first direct voltage and the output node 642 outputs a voltage based on the first direct voltage. When the switch module 644 is switched to the second input node 643, the circuit 64 receives the second direct voltage and the output node 642 outputs a voltage based on the second direct voltage. Configuration of the switch module 644 and the circuit 64 will be described illustratively hereinafter. The power supply module 63 including the circuit 64 supplies power to the controller 65 and, under the control of the controller 65, supplies power to the data receiving module 66, the signal processing module 67, the display module 68, and the backlighting module 620. The data receiving module 66 receives data to be displayed from a data port 62 of the data source device 60. Depending on the data format, the data port 62 may be a HDMI Port, or a DP Port, a VGA port, etc. The data can be transmitted to the data receiving module 66 via multiple data wires 693 . . . 694. The data receiving module 66 typically includes a decoder to decode the received data and to obtain video signal, audio signal, and synchronizing signal. The signal processing module 67 typically includes a scaler, receives a video signal from the data receiving module 66, and converts the video signal into a format suitable for displaying on the display device 61.

Specifically, the first input node 641 may be coupled to, for example, a peripheral connector of the data source device 60 to obtain a direct voltage of 12V or 5V. The second input node 643 may be coupled to an adapter, for example, which receives an alternating voltage of 110VAC or 220VAC and outputs a direct voltage of 12V or 5V.

In addition to the one or more advantages that can be realized by the circuit 24 of FIG. 2, the circuit 64 shown in FIG. 6 may also be advantageous in the case where the display device 61 may need an external power supply. Because the switch module 644 is switched to one of the first input node 641 and the second input node 643, a short circuit between the power supply module of the data source device 60 and the external power supply 610 can be prevented even if the circuit 64 is coupled to both the first port 601 of the data source device 60 and the external power supply 610 in an error operation.

Figure 7:
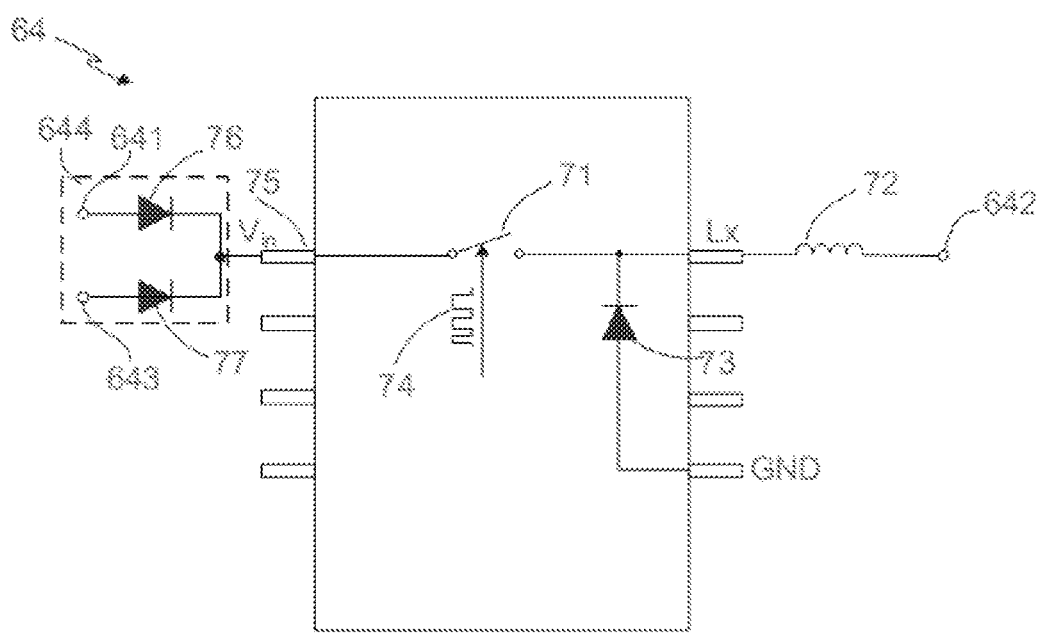
FIG. 7 shows an exemplary configuration of the circuit of FIG. 6 including a switch module.

FIG. 7 shows an exemplary construction of the circuit of FIG. 6 including a switching module. In the example, the circuit 64 is shown as a DC-DC voltage converter in a pin package. The circuit includes a switch 71 coupled between a voltage input pin 75 and an inductor pin, an external inductor 72 coupled to the inductor pin, a diode 73 coupled between the inductor pin and the ground pin, and a switch module 644 couple to the voltage input pin 75. As shown, the switch module 644 is shown as including a first diode 76 and a second diode 77, respectively coupled to the first input node 641 and the second input node 643.

In operation, the switch module 644 is switched to the first input node 641, i.e., the first diode 76 is turned on and the second diode 77 is turned off, if the voltage at the first input node 641 (the first direct voltage) is higher than the voltage at the second input node 643 (the second direct voltage). Alternatively, the switch module 644 is switched to the second input node 643, i.e., the first diode 76 is turned off and the second diode 77 is turned on, if the voltage at the first input node 641 (the first direct voltage) is lower than the voltage at the second input node 643 (the second direct voltage).

For example, if the first direct voltage is 12V, the second direct voltage is 11.6V, and the forward voltage drop of the first diode 76 and the second diode 77 is 0.3V, then the voltage at the input pin is 11.7V, the first diode 76 is turned on and the second diode 77 is turned off. Therefore, a short circuit between the data source device 60 and the external power supply 610 is prevented even if the circuit 64 is coupled to both the first port 601 of the data source device 60 and the external power supply 610.

It should be appreciated that, the encapsulated DC-DC voltage converter shown in FIG. 7 is just illustrative, but not restrictive. Those skilled in the art would understand that a DC-DC voltage converter typically includes delay units and a controller to control the opening and closing of the switch 71 based on an output of a comparator. For simplicity, the controller, the comparator, and other components of the DC-DC converter are not shown in FIG. 7.

Figure 8:
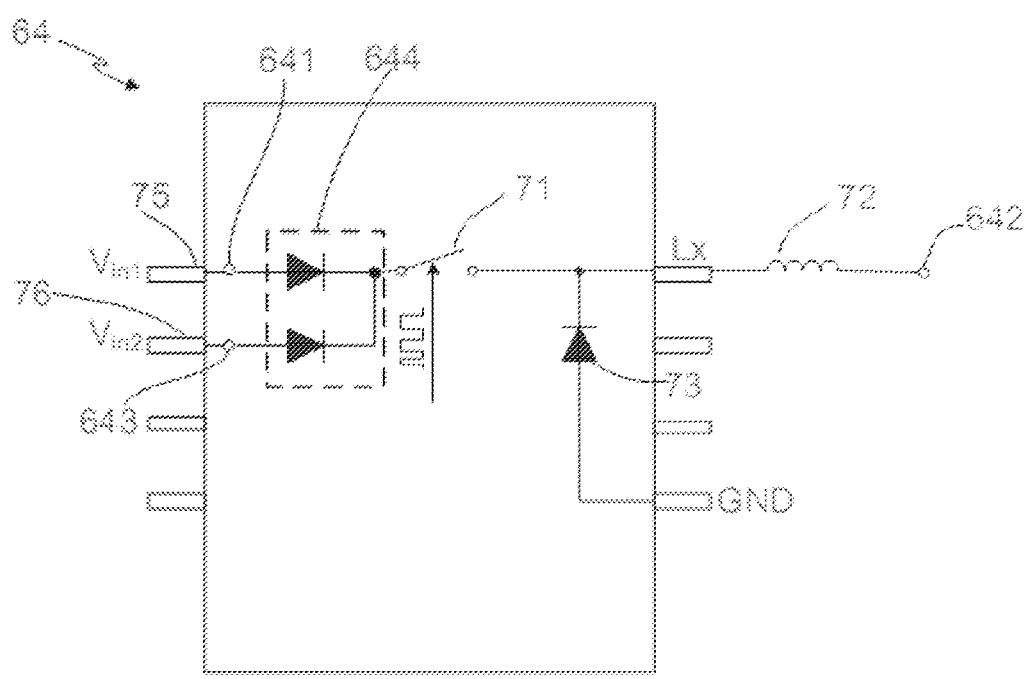
FIG. 8 shows another exemplary configuration of the circuit of FIG. 6 including a switch module.

FIG. 8 shows another exemplary construction of the circuit of FIG. 6 including a switching module. The circuit 64 is still shown as a DC-DC voltage converter in a pin package. In comparison with that of FIG. 7, the switch module 644 is integrated on package in the example of FIG. 8. As shown, the DC-DC voltage converter includes a first input pin 75 and a second input pin 76, respectively leading out the first input node 641 and the second input node 643. When the first direct voltage is higher than the second direct voltage, the output node 642 outputs a voltage generated based on the first direct voltage. When the first direct voltage is lower than the second direct voltage, the output node 642 outputs a voltage generated based on the second direct voltage.

It should be appreciated that, the DC-DC voltage converter can employ package types other than the pin type shown in FIG. 8, for example, a Ball-Grid_Array (BGA) package. When employing a BGA package, the first input node 641 and the second input node 643 can be respectively led out by a first solder ball and a second solder ball.

It should be appreciated that although the switch module is described as being used with DC-DC voltage converters in FIGS. 7 and 8, the switch module can be used with other voltage converting circuits, for example, a LDO linear voltage regulator.

It should be appreciated that the construction of the switch module 644 shown in FIGS. 7 and 8 is just illustrative, and the switch module can take other forms, for example, a circuit including a voltage comparator and field effect transistors. Furthermore, the switch module 644 is not necessarily realized by circuits, and it can be realized in a mechanical manner. For example, a single-pole, double-throw switch can be coupled between the first input node 641, the second input node 643, and the voltage input pin of the packaged DC-DC voltage converter, and which can be switched to the first input node 641 or the second input node 643 by a button or toggle provided outside the display device 61.

Figure 9:
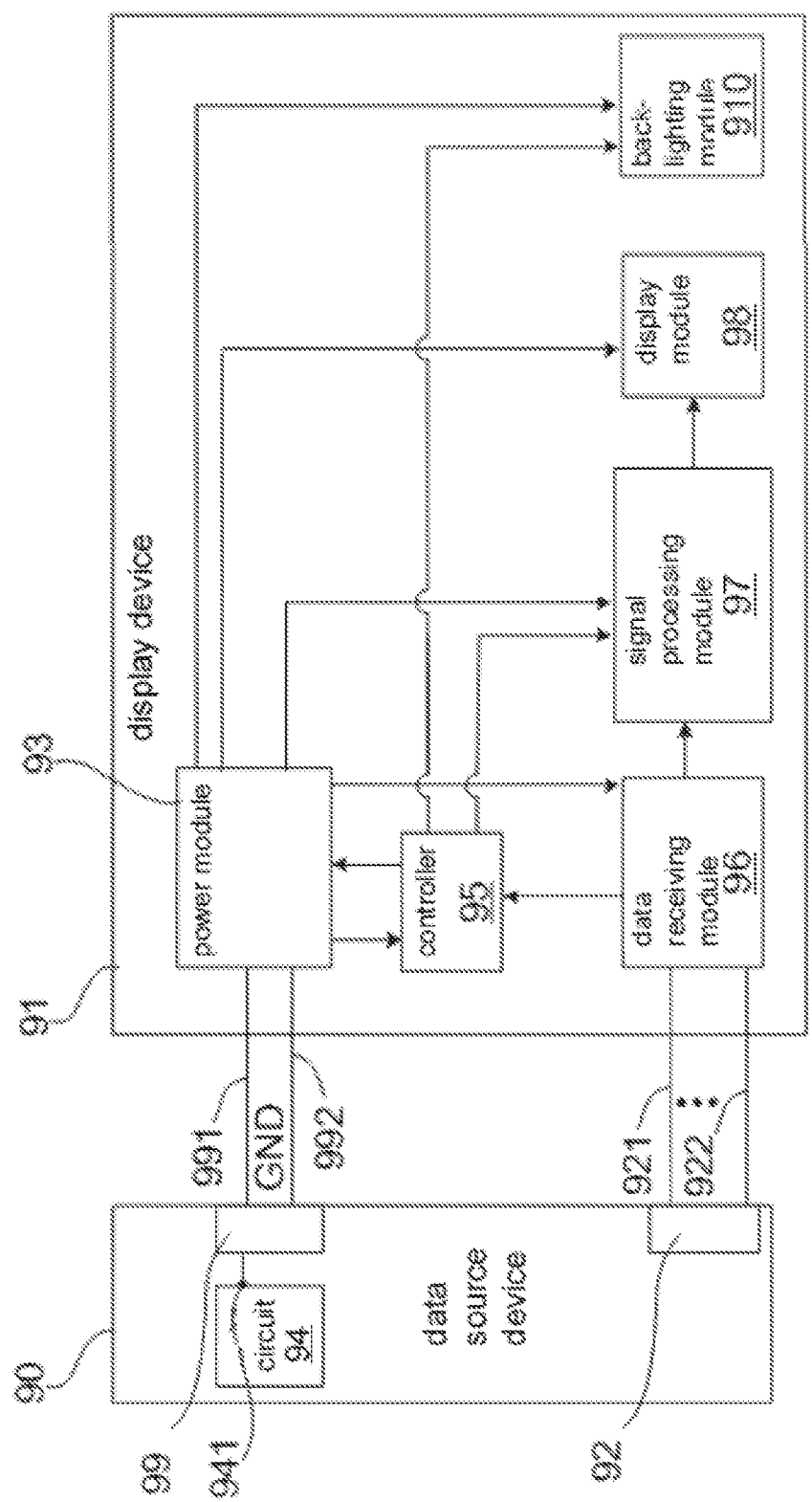
FIG. 9 shows a schematic drawing of a circuit for use with a data source device according to an exemplary embodiment of the disclosure.

FIG. 9 shows a schematic drawing of a circuit for use with a data source device according to an exemplary embodiment of the disclosure. In FIG. 9, by way of example, the circuit 94 is used with a data source device 90. As shown, the circuit 94 includes a first output node 941 coupled to a first connector 99, wherein the first port 99 is isolated from a data port 92 of the data source device 90.

In operation, the first output node 941 of the circuit 94 is coupled to a display device 91, for example, a LCD, a plasma display, etc., via power supply wires 991 to provide the display device 91 with a first direct voltage, wherein the wire 992 is grounded to provide a reference voltage. The first direct voltage is used for a real-time display of the data transmitted via the data wires 921 . . . 922 on the display device 91. The power supply module 93 of the display device supplies power for the controller 95 and, under the control of the controller 95, supplies power for the data receiving module 96, the signal processing module 97, the display module 98, and the backlighting module 910. The data receiving module 96 receives data to be displayed from a data port 92 of the data source device 90. Depending on the data format, the data port 92 may be a HDMI Port, or a DP Port, a VGA port, etc. The data can be transmitted to the data receiving module 96 via multiple data wires 921 . . . 922. The data receiving module 96 typically includes a decoder to decode the received data and to obtain a video signal, audio signal, and synchronizing signal. The signal processing module 97 typically includes a scaler, receives a video signal from the data receiving module 96, and converts the video signal into a format suitable for displaying on the display device 91.

Specifically, the first input node 941 may be coupled to, for example, an output node of the power module of the data source device 90 to obtain a direct voltage of 12V or 5V. The direct voltage is used for a real-time display of data obtained from the data source device 90 on the display device 91.

Figure 10:
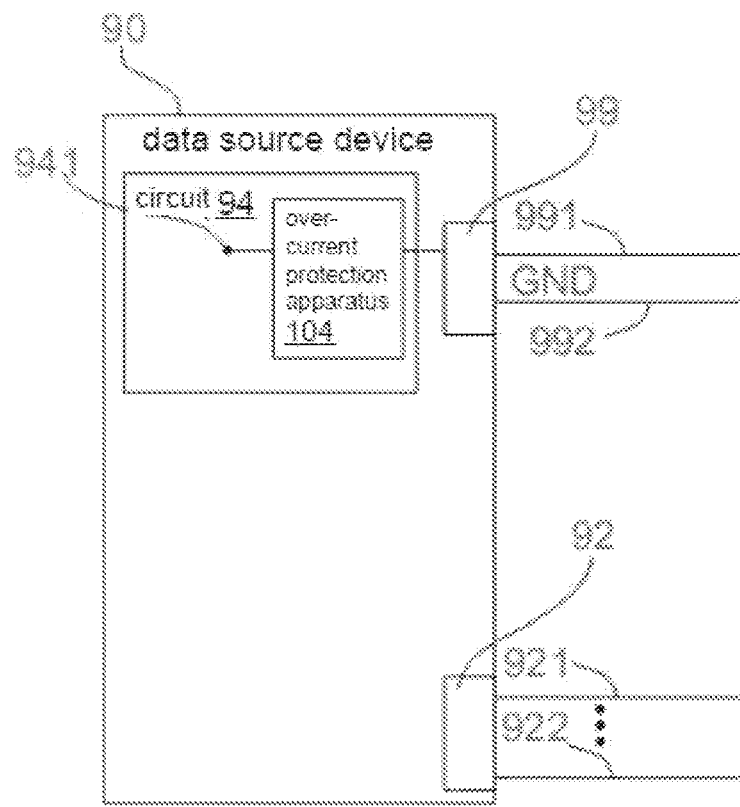
FIG. 10 shows a schematic drawing of a circuit for use with a data source device according to another exemplary embodiment of the disclosure.

FIG. 10 shows a schematic drawing of a circuit for use with a data source device according to another exemplary embodiment of the disclosure. In comparison with the circuit of FIG. 9, the circuit 94 of FIG. 10 further includes an overcurrent protection apparatus 104, coupled between the first output node 941 and the first port 99, so as to provide overcurrent protection for the first output node 941 when the first output node 941 is short circuited, or when an overcurrent is otherwise drawn. The overcurrent protection apparatus 104 can take any suitable form, for example, a fuse element.

Embodiments of circuits for use with display device and circuits for use with data source device have been described in the foregoing. And embodiments of a method for supplying power to a display device are described with reference to circuits. On the basis of the disclosure, combinations of, or modifications on, the embodiments which fall within the scope of the disclosure can be made, for example, the circuits shown in FIGS. 11 and 12.

Figure 11:
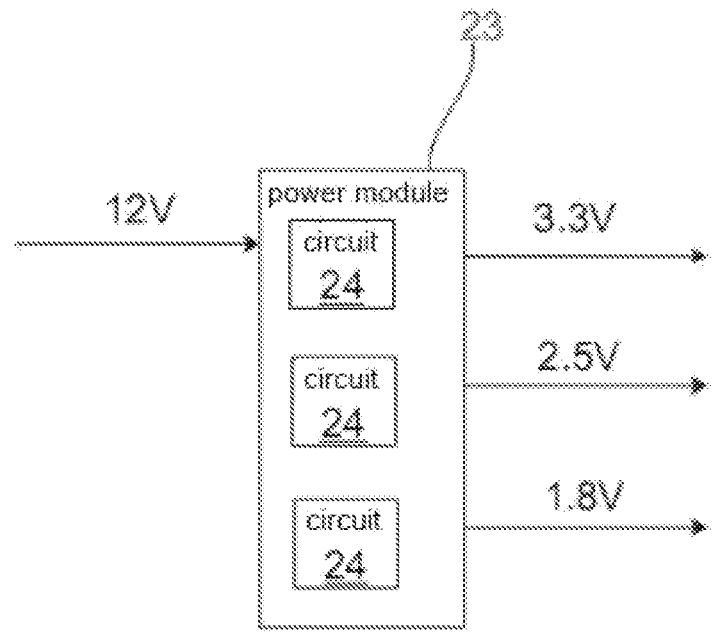
FIG. 11 shows an exemplary combination of the circuit of FIG. 2.

FIG. 11 shows a combination of the circuit of FIG. 2. The display device 21 generally requires multiple operation voltages, for example, 3.3V, 2.5V and 1.8V. The power supply module 23 may include multiple circuits 24, each including a first input node 241 coupled to the first port 201 of the data source device 20 to receive a first direct voltage which is shown as 12V in FIG. 11. By changing the duty ratio of the control signal on the switch 51 of each circuit 24, the multiple circuits 24 have different output voltages, shown as 3.3V, 2.5V and 1.8V in the figure.

Figure 12:
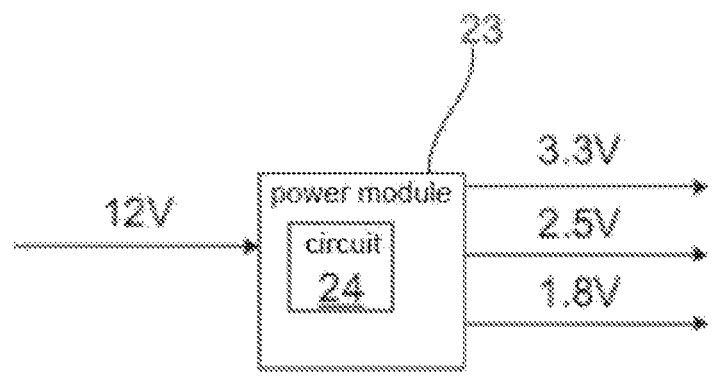
FIG. 12 shows an exemplary modification on the circuit of FIG. 2.

FIG. 12 shows a modification on the circuit of FIG. 2. The circuit 24 is configured to be a multi-level output converter.

In the disclosure herein, operations of circuit embodiment(s) may be described with reference to method embodiment(s) for illustrative purposes. However, it should be appreciated that the operations of the circuits and the implementations of the methods in the disclosure may be independent of one another. That is, the disclosed circuit embodiments may operate according to other methods and the disclosed method embodiments may be implemented through other circuits.

It will also be readily understood by those skilled in the art that materials and methods may be varied while remaining within the scope of the present disclosure. It is also appreciated that the present disclosure provides many applicable concepts other than the specific contexts used to illustrate embodiments.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A display device, comprising:
    a data-receiving circuit comprising a data port configured to be coupled to a first port of a data source device, wherein the data port of the data-receiving circuit is configured to receive data for use in the display device via the first port of the data source device;
    a power circuit comprising a first power port that is separate from the data port of the data-receiving circuit, wherein the first power port of the power circuit is configured to be coupled to a second port of the data source device and to receive a first power signal from the second port of the data source device and to provide the first power signal to the display device for use in the display device; and
    a controller directly coupled to an output of the data-receiving circuit and to the power circuit through a connection that is separate from any connection between the power circuit and the display device so that the first power signal is to be provided to the display device outside of a path of the controller, wherein the power circuit is configured to provide a supply power to the controller, and wherein the power circuit is configured to provide the supply power to the data-receiving circuit under a control of the controller, wherein a first electrical path between the data port of the data-receiving circuit and the first port of the data source device is devoid of a circuit branch that is input into the power circuit, wherein the controller is connected to the data-receiving circuit by a second electrical path without the power circuit and the first electrical path as intermediaries.

2. The display device of claim 1, wherein the first power port is configured to receive the first power signal from the second port of the data source device without the controller being coupled between the second port of the data source device and the first power port of the power circuit.

3. The display device of claim 1, wherein the power circuit further comprises:
    a controllable switch having a first terminal tied to the first power port, wherein the controllable switch is configured to be controlled by the controller by a control signal; and
    an inductive element having a first terminal tied to a second terminal of the controllable switch, the inductive element further having a second terminal tied to an output node of the power circuit.

4. The display device of claim 3, wherein the control signal comprises a pulse-width modulated (PWM) signal, and wherein the supply power provided by the power circuit to the controller is dependent on a duty cycle of the PWM signal.

5. The display device of claim 1, wherein the power circuit further comprises a second power port that is separate from the data port of the data-receiving circuit and the first power port of the power circuit, wherein the second power port of the power circuit is configured to receive a second power signal from an external source other than the data source device.

6. The display device of claim 5, wherein a voltage of the first power signal is different from a voltage of the second power signal.

7. The display device of claim 5, wherein the power circuit further comprises:
    a switching circuit configured to switch between the first power port and the second power port, wherein the switching circuit is configured to switch to the first power port in response to a voltage at the first power port being higher than a voltage at the second power port, and to switch to the second power port in response to the voltage at the first power port being less than the voltage at the second power port.

8. The display device of claim 1, wherein the power circuit comprises a DC-DC voltage convertor configured to convert the first power signal to the supply power.

9. The display device of claim 1, wherein the first power port is further configured to receive a reference voltage, different from the first power signal, for use in the display device via the second port of the data source device.

10. The display device of claim 1, wherein the first power port is further configured to connect to an overcurrent circuit coupled to the first power port, wherein the overcurrent circuit is configured to limit a current drawn by the display device.

11. A display device, comprising:
    a data receiving module comprising a data port configured to be coupled to a first port of a data source device and receive data for use in the display device;
    a power module comprising:
        a first power port that is separate from the data port of the data receiving module and configured to be coupled to a second port of the data source device, the first power port being configured to receive a first power signal and provide the first power signal to the display device, wherein the data port of the data receiving module is coupled to the first port of the data source device by a first electrical path that is devoid of a branch that is input into the power module; and
        a second power port that is separate from the data port of the data receiving module and the first power port, the second power port being configured to receive a second power signal from a source other than the data source device, wherein the second power signal is configured to provide power to the power module when power from the data source device is unavailable; and
    a controller directly coupled to an output of the data receiving module and to the power module, wherein the controller is connected to the data receiving module by a second electrical path without the power module and the first electrical path as intervening circuit elements such that no power is provided to the data receiving module via the first electrical path, wherein the second port of the data source device and the first power port of the power module are coupled without the controller being there-between.

12. The display device of claim 11, wherein the power module is configured to provide a supply voltage to the data receiving module under a control of the controller.

13. The display device of claim 11, wherein the power module further comprises:
    a DC-DC voltage converter connected to the first power port and the second power port, the DC-DC voltage converter comprising a switch module configured to switch to the first power port in response to a voltage at the first power port being higher than a voltage at the second power port and to switch to the second power port in response to the voltage at the first power port being unavailable or lower than the voltage at the second power port; and a plurality of power circuits connected to the switch module of the DC-DC voltage converter, wherein each of the plurality of power circuits receives power from the switch module.

14. The display device of claim 13, wherein each of the plurality of power circuits comprises:

a switch and inductor circuit connected to the controller, wherein the controller is configured to generate a separate PWM control signal for each switch and inductor circuit, wherein the separate PWM control signals have different duty cycles, and wherein each of the plurality of power circuits is configured to generate a different output voltage based on a duty cycle of a respective PWM control signal associated therewith.

15. The display device of claim 11, wherein the first power port is further configured to receive a reference voltage, different from the first power signal, for use in the display device via the second port of the data source device.

16. The display device of claim 11, wherein the first power port is further configured to connect to an overcurrent circuit coupled to the first power port, wherein the overcurrent circuit is configured to limit a current drawn by the display device.

17. A display device, comprising:

a data-receiving circuit comprising a data port configured to be coupled to a first port of a data source device, wherein the data port of the data-receiving circuit is configured to receive data for use in the display device via the first port of the data source device;

a power circuit comprising a first power port that is separate from the data port of the data-receiving circuit, wherein the first power port of the power circuit is configured to be coupled to a second port of the data source device and to receive a first power signal and to provide the first power signal to the display device for use in the display device via the second port of the data source device;

a signal processing circuit configured to process an output signal of the data-receiving circuit; and a controller directly coupled to an output of the data-receiving circuit and to the power circuit, wherein the power circuit is configured to provide a supply power to the controller, and wherein the power circuit is configured to provide the supply power to the data-receiving circuit and the signal processing circuit under a control of the controller in a manner such that no power is provided through the controller, wherein a first electrical path between the data port of the data-receiving circuit and the first port of the data source device is devoid of a circuit branch that is input into the power circuit, wherein the controller is connected to the data-receiving circuit by a second electrical path without the power circuit and the first electrical path as intermediaries.

18. The display device of claim 17, wherein the first power port is further configured to connect to an overcurrent circuit coupled to the first power port, wherein the overcurrent circuit is configured to limit a current drawn by the display device.

19. The display device of claim 17, wherein the power circuit comprises a DC-DC voltage convertor configured to convert the first power signal to the supply power.

20. The display device of claim 17, wherein the first power port is configured to receive the first power signal from the second port of the data source device without the controller being coupled between the second port of the data source device and the first power port of the power circuit.

* * * * *